(12) United States Patent
Raffenberg

(10) Patent No.: US 7,979,958 B2
(45) Date of Patent: Jul. 19, 2011

(54) WORK APPARATUS

(75) Inventor: Michael Raffenberg, Fellbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 849 days.

(21) Appl. No.: 11/603,061

(22) Filed: Nov. 22, 2006

(65) Prior Publication Data

US 2007/0136976 A1 Jun. 21, 2007

(30) Foreign Application Priority Data

Nov. 22, 2005 (DE) .................. 10 2005 055 614

(51) Int. Cl.
*A47L 5/14* (2006.01)

(52) U.S. Cl. .................. 15/405; 15/327.5; 15/300.1

(58) Field of Classification Search .......... 15/405, 15/330, 344, 327.5, 30.1
See application file for complete search history.

(56) References Cited

U.S. PATENT DOCUMENTS

| | | | | |
|---|---|---|---|---|
| 3,887,848 A * | 6/1975 | Larson et al. | .................. | 361/56 |
| 3,912,973 A * | 10/1975 | Young | .................. | 361/223 |
| 4,654,748 A * | 3/1987 | Rees | .................. | 361/220 |
| 4,664,158 A * | 5/1987 | Sands | .................. | 139/422 |
| 4,674,146 A * | 6/1987 | Tuggle et al. | .................. | 15/330 |
| 4,762,497 A * | 8/1988 | Burvee | .................. | 439/37 |
| 4,847,729 A * | 7/1989 | Hee | .................. | 361/220 |
| RE33,050 E * | 9/1989 | Tuggle et al. | .................. | 15/330 |
| 5,004,425 A * | 4/1991 | Hee | .................. | 439/37 |
| 5,083,367 A * | 1/1992 | Klepel | .................. | 29/825 |
| 5,691,875 A * | 11/1997 | Dangelmayer et al. | ........ | 361/222 |
| 5,857,439 A * | 1/1999 | Will et al. | .................. | 123/184.21 |
| 6,004,093 A * | 12/1999 | Ishikawa | .................. | 415/98 |
| 6,305,048 B1 * | 10/2001 | Salisian | .................. | 15/326 |
| 6,873,516 B1 * | 3/2005 | Epstein | .................. | 361/220 |
| 7,182,295 B2 * | 2/2007 | Redmond | .................. | 244/158.1 |
| 7,415,749 B2 * | 8/2008 | Joos | .................. | 15/405 |
| 7,490,878 B1 * | 2/2009 | Opansky et al. | .................. | 294/1.1 |
| 2001/0005918 A1 * | 7/2001 | Miyamoto | .................. | 15/326 |
| 2003/0167594 A1 * | 9/2003 | Iida et al. | .................. | 15/405 |
| 2004/0154687 A1 * | 8/2004 | Mann | .................. | 141/1 |
| 2005/0039298 A1 | 2/2005 | Joos | | |
| 2005/0229556 A1 * | 10/2005 | Haberlein | .................. | 55/360 |
| 2006/0162116 A1 * | 7/2006 | Andresen et al. | .................. | 15/330 |
| 2006/0185114 A1 * | 8/2006 | Joos et al. | .................. | 15/330 |
| 2009/0223017 A1 * | 9/2009 | Hittmann et al. | .................. | 15/405 |

* cited by examiner

*Primary Examiner* — Shay L Karls
(74) *Attorney, Agent, or Firm* — Walter Ottesen

(57) ABSTRACT

A work apparatus such as a blower apparatus (1) or a spray apparatus (31) has a drive motor (5), a blower wheel (11) and a blower tube (12). The blower wheel (11) is driven by the drive motor (5) and moves a flow of air through the blower tube (12). The work apparatus (1, 31) has a back carrier (2) on which the drive motor (5) is mounted. In order to avoid electrostatic charges during operation, the back carrier (2) has an arrangement which establishes an electrically conductive connection between the work apparatus (1, 31) and the operator (18) of the work apparatus (1, 31) during operation thereof.

11 Claims, 2 Drawing Sheets

WORK APPARATUS

CROSS REFERENCE TO RELATED APPLICATION

This application claims priority of German patent application no. 10 2005 055 614.0, filed Nov. 22, 2005, the entire content of which is incorporated herein by reference.

FIELD OF THE INVENTION

The invention relates to a work apparatus such as a blower apparatus or spray apparatus. The work apparatus includes a drive motor having a blower wheel and a blower tube. The blower wheel is driven by the drive motor and moves a flow of air through the blower tube.

BACKGROUND OF THE INVENTION

A blower apparatus is disclosed in US 2005/0039298 A1. The blower apparatus moves a flow of air through a blower tube. The airflow can also function as a carrier airflow for a spray medium which is to be discharged and this spray medium can be introduced into the carrier airflow in the blower tube, for example, as a liquid or granulate. This can lead to electrostatic charges in the blower tube. If the operator touches the electrostatically charged blower tube, the operator can experience unwanted electrostatic discharges. To avoid this, patent publication US 2005/0039298 A1 teaches mounting a potential compensating conductor in the blower tube which is electrically conductively connected to the motor of the work apparatus and conducts charges from the blower tube to the motor. However, especially when using the blower apparatus as a dust apparatus or granulate apparatus, it can happen that the charges can not be completely conducted away from the blower tube so that an electrostatic charge nonetheless occurs.

SUMMARY OF THE INVENTION

It is an object of the invention to provide a work apparatus of the kind described above wherein an improved protection of the operator is provided against unwanted electrostatic discharges.

The work apparatus of the invention includes: a back carrier; a blower tube; a drive motor; a blower wheel driven by the drive motor for moving a flow of air through the blower tube; the drive motor being mounted on the back carrier; and, the back carrier including means for providing an electrically conductive connection between the work apparatus and an operator of the work apparatus during operation thereof.

The operator and the work apparatus are at the same electrical potential in that the operator is electrically connected to the work apparatus so that no unwanted electrostatic discharges occur during operation between the operator and the work apparatus. A portion of the charges of the work apparatus can be guided via the operator to the ground because the operator stands on the ground during operation. In this way, additional devices for conducting away the charges to the ground, such as a chain or the like, which drags along the ground and hinders the operator during operation is not needed. The operator is electrically conductively connected to the work apparatus via the back carrier and this ensures that the electric connection is continuously maintained during operation. Even when the operator does not guide the work apparatus at the handle or handles provided therefor, it is ensured that unwanted discharges do not occur between the operator and the work apparatus.

The electrically conductive connection between the work apparatus and the operator is established in that the back carrier has at least one region made of an electrically conductive material which is in contact with the operator during operation of the work apparatus. Advantageously, the region of electrically conductive material includes electrically conductive threads. The region of electrically conductive material can, for example, be a fabric or the like into which the electrically conductive threads are woven. In this way, a good conducting away of the electric charges between the work apparatus and the operator is ensured. The electrically conductive threads make possible that the region can be configured to be flat and comparatively large so that a good contact to the operator during operation is ensured. Advantageously, the electrically conductive threads include carbon fibers in the core region which effect the electrical conductivity. Such threads can be easily processed and have an adequate strength so that the electrically conductive connection is ensured during operation.

Advantageously, the back carrier has at least one carrier belt on which the region of electrically conductive material is formed. During operation of the work apparatus, the carrier belt is always arranged on the operator. The weight of the work apparatus presses on the carrier belt and this ensures that the carrier belt lies tightly on the operator. Advantageously, the back carrier includes a back cushion on which the region of electrically conductive material is formed. During operation, the back cushion lies on the back of the operator so that here too a contact to the operator is ensured.

The above means provides an electrically conductive connection between the operator and a metallic ground body of the work apparatus. The metallic ground body can take up a comparatively large quantity of charge and thereby defines a charge store. The ground body is especially the drive motor of the work apparatus. A potential compensating conductor is mounted in the blower tube in order to conduct charges away from the blower tube. The means establishes an electrically conductive connection between the operator and the potential compensating conductor of the work apparatus. In this way, the charges, which are conducted away by the potential compensating conductor from the blower tube, can be conducted into the ground via the electrically conductive connection between the operator and the potential compensating conductor. In this way, a reduction of the static charge of the work apparatus and the operator is achieved.

A simple configuration results when the work apparatus has a housing wherein the drive motor is mounted and the housing is fixed to the back carrier via at least one electrically conductive antivibration element. The electrically conductive connection is established via the antivibration element. In work apparatus having a back carrier, usually helical springs are used as antivibration elements. To realize an electrically conductive connection between the back carrier and the housing of the work apparatus, one end of the helical spring is connected to the ground body and/or to the potential compensating conductor and the other end of the helical spring is connected to the back carrier. In this way, no additional devices for establishing the electrically conductive connection are necessary. The vibration gap, which is formed between the back carrier and the housing, can in this way be bridged in a simple manner.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
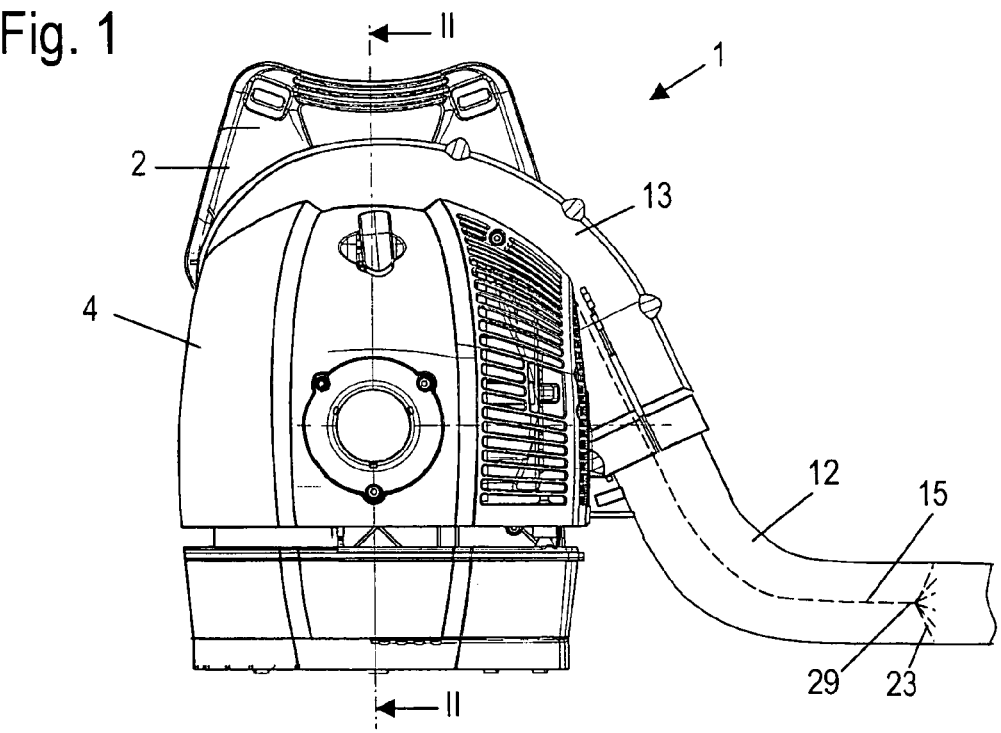
FIG. 1 is a side elevation view of a blower apparatus.

The blower apparatus 1 shown in FIG. 1 has a back carrier 2 on which a housing 4 of the blower apparatus 1 is mounted. The back carrier 2 can be carried by an operator in the manner of a rucksack. The housing 4 has a spirally-shaped blower housing 13 to which a blower tube 12 is connected. A potential compensating conductor 15 is arranged in the blower tube 12. At its free end 29, the potential compensating conductor 15 has a spider-like support 23 which positions the potential compensating conductor 15 centrally in the blower tube 12. The spider-like support 23 can, for example, be made of wires which extend radially outwardly from the free end 29 of the potential compensating conductor 15 and brace themselves against the inner wall of the blower tube 12. The potential compensating conductor 15 comprises electrically conductive material, especially, metal. Charges in the blower tube 12 can be well conducted away by the potential compensating conductor 15 because the potential compensating conductor 15 is configured to be electrically conductive on its surface over its entire length.

Figure 2:
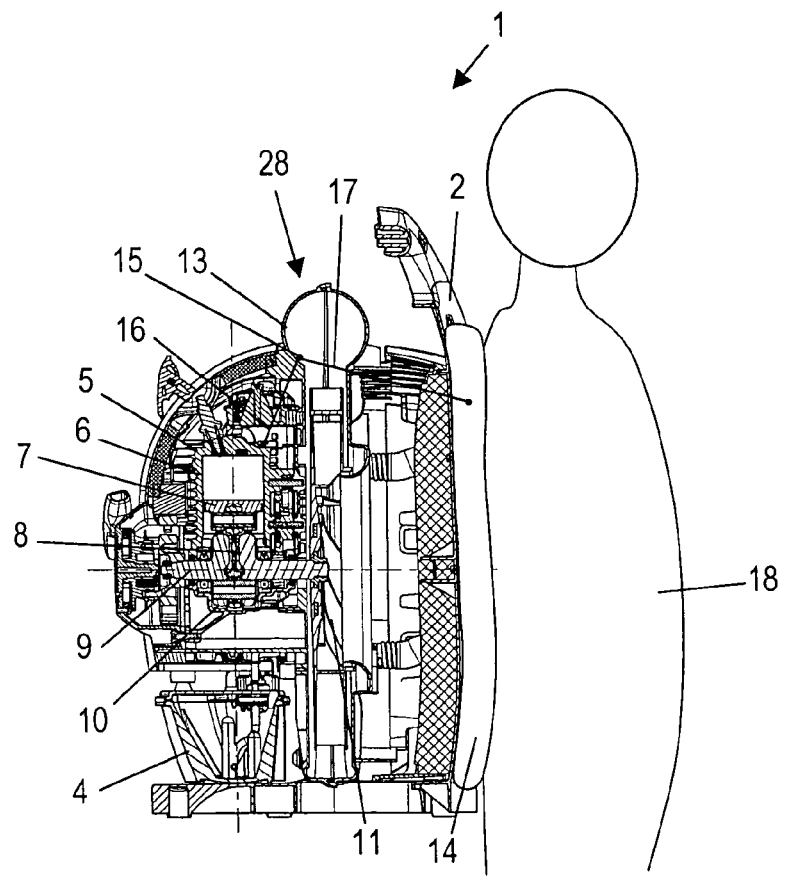
FIG. 2 is a section view of the blower apparatus of FIG. 1 taken along line II-II of FIG. 1.

As shown in FIG. 2, a blower wheel 11 is journalled or supported in the blower housing 13. The blower wheel 11 with the spirally-shaped blower housing 13 conjointly forms a blower 28. The blower 28 moves a flow of air through the blower tube 12. When the blower apparatus 1 is driven as a spray apparatus or as a dusting or granulate apparatus, the airflow through the blower tube 12 functions as a carrier airflow for the medium, which is to be sprayed, for example, a liquid or a granulate.

A drive motor 5 is mounted in the housing 4. The drive motor 5 is configured as an internal combustion engine and can, for example, be a single cylinder two-stroke engine or a single cylinder four-stroke engine. The drive motor 5 has a cylinder 6 in which a piston 7 is journalled to move back and forth. The piston 7 drives a crankshaft 9 via a connecting rod 8. The crankshaft 9 is rotatably journalled in a crankcase 10. The blower wheel 11 is fixed at one end of the crankshaft 9 and this blower wheel is rotatably driven by the crankshaft 9.

The potential compensating conductor 15 shown in FIG. 1 is mounted in the blower tube 12 and in the blower housing 13. As shown in FIG. 2, the potential compensating conductor 15 is electrically connected via an electrically conductive connection 16 to the cylinder 6 of the drive motor 5. The cylinder 6 defines a metallic ground body which can take up a large quantity of charges. The charges, which are conducted away from the blower tube 12 by the potential compensating conductor 15, can be conducted into the cylinder 6 via the connection 16. In this way, the static charge of the blower tube 12 is reduced.

In FIG. 2, an operator 18 is shown schematically and this operator carries a back carrier 2 on his back. A back cushion 14 is arranged on the side of the back carrier 2 which faces toward the operator 18. The back cushion 14 is configured on its surface to be electrically conductive. The entire surface of the back cushion 14 is covered by a fabric which contains electrically conductive threads. The back cushion 14 can, however, also be configured to be electrically conductive in only a delimited region. The potential compensating conductor 15 is connected to the back cushion 14 via an electrically conductive connection 17. In this way, the charges, which have been conducted away from the blower tube by the potential compensating conductor 15, can be continuously conducted also to the operator 18. Since the operator 18 stands on the ground, the charges are conducted away from the operator 18 into the ground.

The operator 18 is at the same electrical potential as the blower tube 12 so that no unwanted electrostatic discharges can occur between the operator 18 and the blower tube 12. The operator 18 is also connected to the drive motor 5 via the connection 16. If the operator wears electrically insulated shoes or if, for some other reason, a conducting away of the charges from the operator 18 into the ground does not take place, then a large portion of the charges is stored in the drive motor 5.

Figure 3:
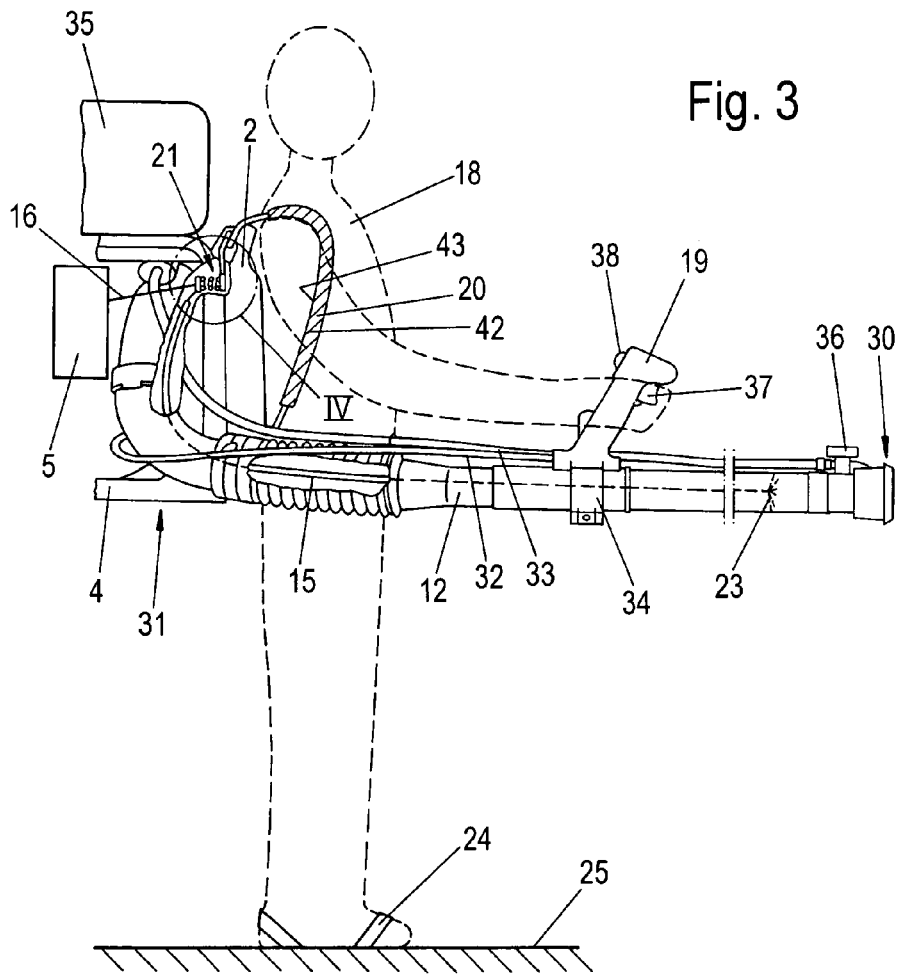
FIG. 3 is a schematic representation of a spray apparatus.

The work apparatus is configured as a spray apparatus 31 in the embodiment shown in FIG. 3. The configuration of the spray apparatus 31 corresponds essentially to that of the blower apparatus 1 of FIGS. 1 and 2; however, the spray apparatus 31 additionally includes a spray tank 35 for spray medium. The spray tank 35 is connected to the free end 30 of the blower tube 12 via lines 32 and 33. In the region of the free end 30, the lines 32 and 33 open into the blower tube 12 via one or several valves 36 and the spray medium is entrained by the airflow moved through the blower tube 12 and is thereby discharged.

Two carrier belts 20 are fixed to the back carrier 2 of the spray apparatus 31 and one of the carrier belts is shown in FIG. 3. The two carrier belts 20 are configured as shoulder belts and are carried over the shoulder by the operator 18. A handle 19 is fixed to the blower tube 12 by a strap 34. On the handle 19, the operator 18 can guide the blower tube 12 in the desired direction and can control the drive motor via the operator-controlled levers 37 and 38.

The drive motor 5 is mounted in the housing 4 of the spray apparatus 31. The drive motor 5 causes vibrations during operation. So that these vibrations are not transmitted to the back carrier 2 or are transmitted only to a minimal extent, the housing 4 is fixed to the back carrier 2 via antivibration elements 21. One of the antivibration elements 21 is shown in FIG. 3.

Figure 4:
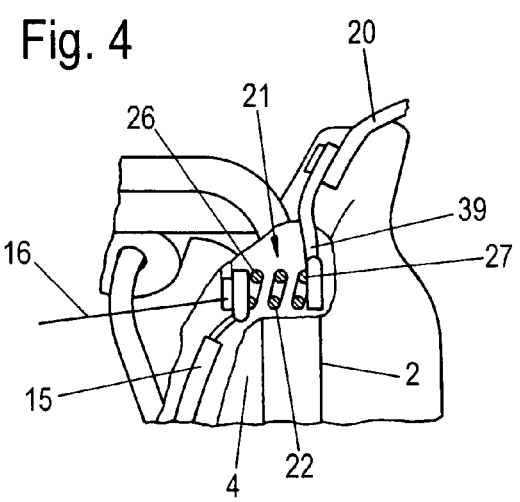
FIG. 4 is an enlarged view of section IV of FIG. 3.

As the enlarged representation in FIG. 4 shows, the antivibration element 21 includes a helical spring 22 which comprises a metallic material and is therefore electrically conductive. A first end 26 of the helical spring 22 is fixed to the housing 4 of the spray apparatus 31. The opposite-lying second end 27 is fixed to the back carrier 2. The carrier belt 20 is electrically conductively connected to the second end 27 of the helical spring 22 via a connection 39. The carrier belt 20 can, however, also be mounted directly at the second end 27 of the helical spring 22 and be electrically conductively connected to the helical spring 22.

The first end 26 of the helical spring 22 is electrically conductively connected to the potential compensating conductor 15 shown in FIG. 3. Furthermore, at the second end 26 of the helical spring 22, the connection 16 is fixed which connects the potential compensating conductor 15 and the helical spring 22 to the drive motor 5. The potential compensating conductor 15 and the drive motor 5 are electrically conductively connected to the carrier belt 20 via the antivibration element 21. The carrier belt 20 is covered by an electrically conductive fabric 42. It can also be provided that only delimited regions of the carrier belt 20 are covered by the fabric 42, for example, the lower side 43 of the carrier belt 20 which faces toward the operator 18.

The spray apparatus 31 is electrically conductively connected to the operator 18 via the antivibration element 21 and the carrier belt 20. Charges of the potential compensating conductor 15 and of the drive motor 5 can be thereby conducted away into the ground 25 via the carrier belt 20 and the operator 18. The operator 18 wears a grounding device 24 on the feet in order to ensure a good conducting away of the charges. These grounding devices can, for example, be so-called grounding bands or shoes capable of conducting away charge. In order to improve the conducting away of charge from the spray apparatus 31, it is further provided that the operator 18 wears suitable electrically conductive clothing. An electrostatic charging of the blower tube 12 and of the operator 18 is avoided in that the electrostatic charges arising in the blower tube 12 are conducted into the ground 25 via the operator 18. Should the conducting away of charge via the operator 18 into the ground 25 not be sufficient, excess charges can furthermore be stored in the drive motor 5.

Figure 5:
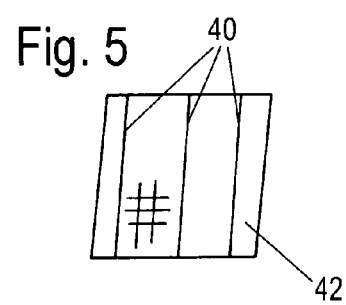
FIG. 5 is a schematic representation of a fabric having electrically conductive threads; and, FIG. 6 is an enlarged schematic cross-sectional representation of an electrically conductive thread.

In FIG. 5, a cutout of the electrically conductive fabric 42 is shown schematically. Electrically conductive threads 40 are woven into the fabric 42 at pregiven distances, for example, in a 5 mm raster. The electrically conductive threads 40 can be woven only in a parallel direction into the fabric 42 in the embodiment. However, it can also be provided that the electrically conductive threads 40 are woven in the longitudinal and transverse directions of the fabric 42.

Figure 6:
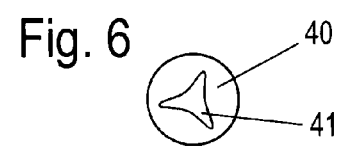

In FIG. 6, an electrically conductive thread 40 is shown in section greatly enlarged. The electrically conductive thread 40 has a core of carbon fibers 41 which, in the embodiment, is configured approximately triangularly. However, also other types of electrically conductively threads can be used.

It is understood that the foregoing description is that of the preferred embodiments of the invention and that various changes and modifications may be made thereto without departing from the spirit and scope of the invention as defined in the appended claims.

What is claimed is:

1. A work apparatus comprising:
   a back carrier;
   a blower tube;
   a drive motor;
   a blower wheel driven by said drive motor for moving a flow of air through said blower tube;
   said drive motor being mounted on said back carrier;
   a housing for accommodating said drive motor therein;
   an electrically conductive antivibration element attaching said housing to said back carrier;
   said antivibration element having first and second ends;
   an electrical ground body and said first end of said antivibration element being electrically connected to said ground body;
   said back carrier having a carrier belt; and,
   an electrically conductive connection connecting said carrier belt to said second end of said antivibration element so as to cause said back carrier to establish an electrically conductive connection via said antivibration element between said electrical ground body and the operator of said work apparatus during the operation thereof and so as to cause the operator to be continuously electrically connected to said electrical ground body via said back carrier during said operation of said work apparatus thereby causing the work apparatus itself to be grounded to earth via the operator.

2. The work apparatus of claim 1, said back carrier having at least one region of an electrically conductive material which is in continuous electrical contact. with the operator during operation of said work apparatus so as to facilitate a continuous conducting away of electric charges via said operator into the ground on which said operator stands.

3. The work apparatus of claim 2, wherein said region of electrically conductive material has electrically. conductive threads.

4. The work apparatus of claim 3, wherein said electrically conductive threads include: a core region; and, a plurality of carbon fibers disposed in said core region to effect the electrical conductance.

5. The work apparatus of claim 2, wherein said back carrier has at least one carrier belt and said carrier belt has a region configured of electrically conductive material.

6. The work apparatus of claim 2, wherein said back carrier includes a back cushion and said back cushion has a region configured of electrically conductive material.

7. The work apparatus of claim 2, further comprising an electrically conductive connection on said back carrier between the operator and said electrical ground body of said work apparatus and said electrical ground body being made of metal.

8. The work apparatus of claim 7, wherein said electrical ground body is said drive motor.

9. The work apparatus of claim 2, further comprising a potential compensating conductor mounted in said blower tube for conducting away electrical charges from said blower tube; and, an electrically conductive connection on said back carrier between the operator and said potential compensating conductor.

10. The work apparatus of claim 1, wherein said work apparatus further comprises:
    a potential compensating conductor arranged in said blower tube and said first end of said antivibration element also being electrically connected to said potential compensating conductor; and, said back carrier including a back cushion; and,
    said second end of said antivibration element also being electrically connected to said back cushion.

11. A work apparatus comprising:
    a back carrier;
    a blower tube;
    a drive motor;
    a blower wheel driven by said drive motor for moving a flow of air through said blower tube;
    a housing for accommodating said drive motor therein;
    an electrically conductive antivibration element attaching said housing to said back carrier;
    said antivibration element having first and second ends;
    a potential compensating conductor arranged in said blower tube;
    a first electrical conducting connection connecting said first end of said antivibration element to said potential compensating conductor;
    said back carrier having a back cushion; and,
    a second electrical conducting connection connecting said second end of said antivibration element to said back cushion so as to cause said antivibration element to establish an electrical connection between said potential compensating conductor and the operator of said work apparatus and so as to cause the operator to be continuously electrically connected to said potential compensating conductor via said back carrier during the operation of said work apparatus thereby causing the work apparatus itself to be grounded to earth via the operator.

* * * * *

UNITED STATES PATENT AND TRADEMARK OFFICE
CERTIFICATE OF CORRECTION

| | | |
|---|---|---|
| PATENT NO. | : 7,979,958 B2 | Page 1 of 1 |
| APPLICATION NO. | : 11/603061 | |
| DATED | : July 19, 2011 | |
| INVENTOR(S) | : Michael Raffenberg | |

It is certified that error appears in the above-identified patent and that said Letters Patent is hereby corrected as shown below:

<u>In column 4</u>:
Line 59: delete "second" and substitute -- first --
therefor.

<u>In column 6</u>:
Line 1: delete "contact." and substitute -- contact --
therefor.

Signed and Sealed this
First Day of November, 2011

David J. Kappos
*Director of the United States Patent and Trademark Office*